United States Patent [19]

Neusy

[11] Patent Number: 4,904,292
[45] Date of Patent: Feb. 27, 1990

[54] SPHERULIZING FURNACE AND PROCESS OF MANUFACTURING VITREOUS BEADS

[75] Inventor: Hubert Neusy, Montignies-sur-Sambre, Belgium

[73] Assignee: Glaverbel, Brussels, Belgium

[21] Appl. No.: 216,647

[22] Filed: Jul. 8, 1988

[30] Foreign Application Priority Data

Jul. 9, 1987 [GB] United Kingdom ............... 8716189

[51] Int. Cl.⁴ ............................................. C03B 19/10
[52] U.S. Cl. ..................................... 65/21.3; 65/21.4; 65/142
[58] Field of Search ................ 65/21.3, 21.4, 22, 27, 65/142

[56] References Cited

U.S. PATENT DOCUMENTS

| | | | |
|---|---|---|---|
| 2,044,680 | 6/1936 | Gilbert | 65/21.3 |
| 3,560,186 | 2/1971 | Nylander | 65/142 |
| 4,330,316 | 5/1982 | Hohman et al. | 65/27 |
| 4,445,919 | 5/1984 | Cole et al. | 65/27 |
| 4,643,753 | 2/1987 | Braun | 65/21.3 |
| 4,769,057 | 9/1988 | Smolenski et al. | 65/21.3 |

FOREIGN PATENT DOCUMENTS

| | | |
|---|---|---|
| 0700039 | of 1953 | United Kingdom . |
| 0971583 | of 1964 | United Kingdom . |
| 1550551 | of 1979 | United Kingdom . |
| 2072524 | of 1981 | United Kingdom . |
| 2176774 | 1/1987 | United Kingdom . |
| 2177082 | 1/1987 | United Kingdom . |
| 2177083 | 1/1987 | United Kingdom . |

Primary Examiner—Robert L. Lindsay
Attorney, Agent, or Firm—Spencer & Frank

[57] ABSTRACT

A spherulizing furnace for manufacturing vitreous beads includes feed means for delivering particulate feedstock, a spherulizing zone in which the feedstock particles may be heated and converted to vitreous beads, and means for collecting the resulting beads, wherein the feed means includes a reservoir adapted to hold a fluidized bed of feedstock particles, the reservoir having at least one overflow feed outlet opening over which fluidized particles flow under gravity for delivery to the spherulizing zone. A process of manufacturing vitreous beads, and vitreous beads made thereby, includes delivering feedstock to a spherulizing zone of a spherulizing furnace, passing the feedstock through the spherulizing zone so that the feedstock is heated and converted to vitreous beads, and collecting the beads. The feedstock particles are delivered under gravity by fluidized overflow from a fluidized bed reservoir to the spherulizing zone.

8 Claims, 3 Drawing Sheets

SPHERULIZING FURNACE AND PROCESS OF MANUFACTURING VITREOUS BEADS

CROSS-REFERENCE TO RELATED APPLICATION

This application is related to the subject matter of copending U.S. Patent Application Ser. No. 07/216,646 filed July, 8th 1988 by the present inventor.

BACKGROUND OF THE INVENTION

1. Field of the Invention

This invention relates to a spherulizing furnace for manufacturing vitreous beads comprising feed means for delivering particulate feedstock, a spherulizing zone in which the feedstock particles may be heated and converted to vitreous beads, and means for collecting the resulting beads. The invention includes a process of manufacturing vitreous beads in which feedstock is delivered to a spherulizing zone and passed along it so that the feedstock is heated and converted to vitreous beads whereafter the beads are collected. The invention extends to vitreous beads made by such a process.

2. Description of the Related Art

In classical spherulizing furnaces, particulate feedstock is fed to the base of a vertical cylindrical combustion chamber where it is surrounded by a burner flame in a spherulizing zone and entrained upwardly. The feedstock particles become spherulized by contact with the flame, and the resulting vitreous beads are carried out of the top of the combustion chamber in a stream of hot gas, and thence to cyclones for grading and collection. The feedstock particles are delivered to the combustion chamber in a stream of carrier gas, usually air, or a mixture of air and combustible gas.

As is well known, the way in which the feedstock is heated is of major importance to the economy of the process, and also to the quality and yield of the vitreous beads produced, particularly when those beads are to be cellular, for example monocellular. Rapid heating is beneficial for spherulization and/or vitrification of the feedstock, and this requires good thermal contact between the flame and the feedstock. In order to achieve a product of uniform quality it is important that the beads formed by the process should have been treated uniformly in the combustion chamber, and it is also important to reduce any tendency for the solid material to agglomerate. Thus the particles should be delivered in such a way that they are reasonably well separated both to reduce their tendency to agglomerate and so that they do not shield one another from the heating, and also the feedstock should be delivered in a uniform manner. For introducing the feedstock particles into a carrier gas stream for delivery to the spherulizing chamber, various proposals have been made with this end in view, but they have not been wholly satisfactory.

It is an object of this invention to provide a spherulizing furnace having improved feedstock delivery means.

SUMMARY OF THE INVENTION

According to this invention, there is provided a spherulizing furnace for manufacturing vitreous beads comprising feed means for delivering particulate feedstock, a spherulizing zone in which the feedstock particles may be heated and converted to vitreous beads, and means for collecting the resulting beads, characterised in that said feed means comprises a reservoir adapted to hold a fluidized bed of feedstock particles, the reservoir having at least one overflow feed outlet opening over which fluidized particles can flow under gravity for delivery to the spherulizing zone.

Such a spherulizing furnace has improved feedstock delivery means. The fluidized particles in the reservoir will necessarily be well separated, and this separation is maintained because they are delivered under gravity while still in fluidized condition to the spherulizing zone of the furnace where they are heated and spherulized. There is no necessity for any substantial carrier gas stream which might disturb that separation. Feedstock delivery can proceed at a more uniform rate.

Uniformity of the rate of feedstock delivery can be further promoted by maintaining the height of the fluidized bed at a constant level. A very simple way of doing this is to feed feedstock to the reservoir at an excess rate and to allow the excess feedstock to overflow for recycling. Preferably therefore, said reservoir has at least one overflow control outlet opening at a higher level than that of the or each said overflow feed outlet opening.

Advantageously, said feed means is arranged to deliver fluidized particles substantially symmetrically of the transverse cross section of said spherulizing zone. This promotes uniformity of heating of the particles, assuming of course that the temperature profile across the spherulizing zone is symmetrical.

Preferably, means is provided for heating said reservoir to preheat particles in said fluidized bed. We have found that this leads to a more efficient heating of the feedstock during spherulizing, thus promoting fuel economy and product yield. The reservoir may be located with the chamber containing the spherulizing zone, so that the main furnace heating means also serves to preheat the feedstock, or it may be located outside that chamber. In the latter case the feedstock may be preheated by the fluidizing gas alone, for example after that gas has passed through a heat exchanger, for example heated by furnace flue gases. Alternatively or in addition, auxiliary feedstock heating means may be provided.

The invention extends to a process of manufacturing vitreous beads, and it accordingly provides a process of manufacturing vitreous beads in which feedstock is delivered to a spherulizing zone and passed along it so that the feedstock is heated and converted to vitreous beads whereafter the beads are collected, characterised in that feedstock particles are delivered under gravity by fluidized overflow from a fluidized bed reservoir to the spherulizing zone where they are heated and converted to vitreous beads.

This is a very simple way of delivering a well separated stream of feedstock particles at a uniform rate. This promotes yield and uniformity of product, and fuel economy.

In preferred embodiments of the invention, said fluidized bed is maintained at a constant height. This further promotes uniformity of delivery rate.

Preferably, the fluidized particles are delivered substantially symmetrically of the transverse cross section of said spherulizing zone. This promotes uniformity of heating of the particles, assuming of course that the temperature profile across the spherulizing zone is symmetrical.

Advantageously, the feedstock particles are heated in said fluidized bed prior to delivery. This leads to a more efficient heating of the feedstock during spherulizing, thus promoting fuel economy and product yield.

A process according to the invention is suitable for the manufacture of vitreous beads using feedstocks of various compositions. For the manufacture of solid beads, it is appropriate to use crushed glass cullet of the desired composition. For the manufacture of cellular beads, a pelletized feedstock containing glass formers and cellulating agent of a composition known per se may be used. For the manufacture of a mixture of solid and cellular beads it is appropriate to use a feedstock of particles of incompletely vitrified and/or unrefined glass for example as described in British Patent Specification GB No. 2 176 774 A. Alternatively, particles of a glass-former composition containing chemically bound water may be used for example as described in British Patent Specifications GB No. 2 177 082 A and GB No. 2 177 083 A.

A process according to the invention is also suitable for the manufacture of vitreous beads of various sizes. For example the process may be used in the manufacture of solid beads having sizes in the range 5 $\mu$m to 800 $\mu$m or even larger.

The invention includes vitreous beads made by a process as herein defined.

BRIEF DESCRIPTION OF THE DRAWING

Preferred embodiments of the invention will now be described with reference to the accompanying diagrammatic drawing, in which.

DESCRIPTION OF THE PREFERRED EMBODIMENTS

Figure 1:
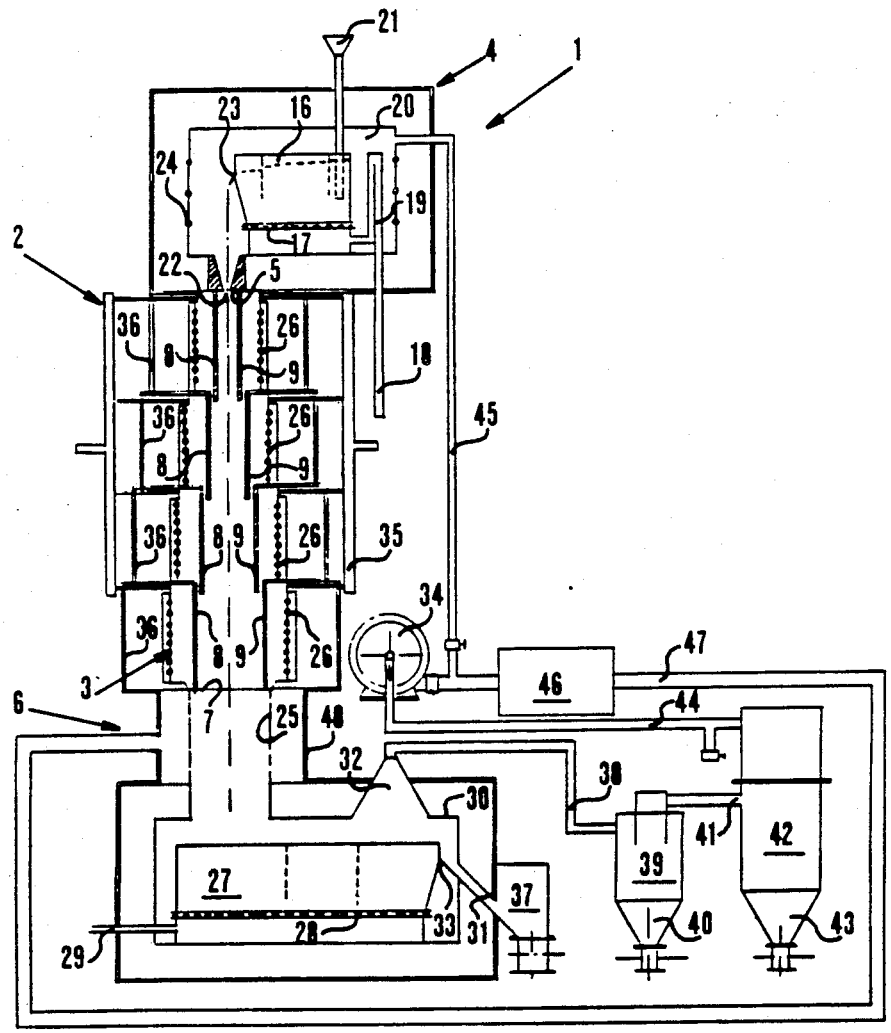
FIG. 1 is a cross sectional view of an embodiment of spherulizing furnace in accordance with the invention.

In FIG. 1, a spherulizing furnace 1 for manufacturing vitreous beads comprises a chamber 2, means 3 for heating the chamber and feed means 4 for delivering a particulate feedstock to one end 5 of the chamber and means 6 for collecting vitreous beads from the other end 7 of the chamber. The chamber 2 comprises pairs of opposed walls 8, 9 which are spaced apart by a distance less than their breadth to define a spherulizing zone and which are angled to the horizontal so that the chamber 2 has upper 5 and lower 7 ends. The feed means 4 is arranged to deliver feedstock to the upper end 5 of the chamber 2 so that the feedstock can pass through the chamber 2 under gravity, and the heating means 3 is arranged to heat at least one wall 8, 9 so that feedstock passing through the spherulizing zone between the walls is heated by radiant heat.

The chamber 2 runs vertically, and comprises an outer housing 35 which carries a structure divided into four parts each of which comprises a support structure 36, electrical heating elements 26 and chamber inner walls 8, 9. The four pairs of opposed inner walls 8, 9 of the chamber 2 which define the spherulizing zone are each constituted by a pair of parallel vertical graphite plates, and the spacing between these plates increases down the chamber.

The increased spacing of the chamber walls 8, 9 down the chamber allows the particles to spread out as they fall through the spherulizing zone while keeping the risk of contact between the particles and the spherulizing zone walls at a low level. In a specific example, the walls 8, 9 are spaced apart by 20 cm in their upper parts and by 30 cm in their lower parts, and they are 1 metre in breadth. The optimum height of the chamber 2 is governed by the desired dwell time of the particles in the furnace, and this in turn depends on the size of the beads to be produced. For producing solid glass beads from crushed cullet, suitable heights are: for a mean bead diameter of 200 $\mu$m, 1.5 to 2 metres; and for a means bead diameter of 800 $\mu$m, 5 metres.

There are gaps between successive plates in each wall, and gas is entrained down through these gaps to form a boundary layer. This also reduces any tendency the particles may have to contact the walls of the spherulizing zone.

Furthermore, because the spherulizing zone walls are of graphite, a material which is not wetted by molten vitreous material, any particles which may contact those walls will have a low tendency to stick to them.

The heating elements 26 may be electrical resistance heating elements, or they may be inductive coils for induction heating of the graphite plates.

In a variant, the walls 8, 9 of the chamber 2 are oppositely inclined to the vertical so as to give a downwardly widening space between them.

The arrangement allows different regions along the spherulizing zone to be heated differently. Differential heating is of particular benefit in the manufacture of cellular and/or vitroceramic beads, that is, beads of partially devitrified glass. By way of example, we have found that for some feedstock compositions, it is desirable to allow the particles to expand while subjected to a temperature in the range 400° C. to 500° C., to heat them to say 800° C. to 900° C. for spherulization, and to heat them to about 1200° C. for partial devitrification, all in order to manufacture cellular vitroceramic beads.

The feed means 4 comprises a feedstock reservoir 16 having a porous sole 17 and a conduit 18 for feeding compressed gas through such sole to fluidize feedstock in the reservoir. The conduit 18 passes a heat exchanger 19 to preheat the fluidizing gas and thus the feedstock particles in the reservoir 16. The reservoir 16 is located in a compartment 20 which is closed except for fluidizing gas inlet 18, a feedstock inlet 21 and a slot 22 located symmetrically over the centre of the spherulizing zone. That compartment 20 is thus pressurized by the fluidizing gas, so that particle feed through the slot 22 is not impeded by any natural updraught through the spherulizing zone. The reservoir 16 has a lip 23 located aligned above the slot 22, so that fluidized feedstock can flow over that lip and fall down through the slot 22 into the heating chamber 2 for spherulization. Auxiliary electric heating means 24 is provided in the compartment 20 for preheating the feedstock, and the heat exchanger 19 is located within that compartment 20.

For a fluidized bed of 500 kg capacity, it is suitable to use as reservoir sole 17 a stainless steel plate 2 square metres in area having a porosity of 35 $\mu$m.

The processed beads are collected via a collection pipe 25. This pipe 25 terminates above a collection reservoir 27 having a porous sole 28 and a conduit 29 for feeding compressed gas through such sole to fluidize beads collected in the reservoir. The use of a fluidizing gas at ambient temperature cools the spherulized beads so that they do not agglomerate. The reservoir 27 is located in a compartment 30 which is closed except for fluidizing gas inlet, a bead inlet 29 25, a bead overflow outlet 31 and an aspirator inlet 32. The reservoir 27 has a lip 33 located so that fluidized beads can flow over that lip and fall down through the bead overflow outlet 31. An aspirator 34 is connected to aspirator inlet 32 to maintain a slight under-pressure at the base of the collection pipe 25 to overcome any heat stoppage due to thermal updraughts created in the heating spherulizing zone 2.

Beads flowing over the overflow outlet 31 are collected in an overflow collector 37. Lighter and/or less dense beads may be sucked up through aspirator inlet 32 when they will be transported along conduit 38 to a cyclone 39 having a further collector 40 at its base. Beads which pass the cyclone are transported via a further conduit 41 to a sleeve filter 42 having a final bead collector 43 at its base. The overflow collector 37, the cyclone collector 40 and the sleeve filter collector 43 may each be fitted with a rotatable valve for drawing off bead fractions as desired. The sleeve filter is connected to the aspirator 34 by conduit 44, and the aspirated gas which has been heated by exchange with the beads may be passed via conduit 45 to the feed compartment 20, and/or it may be cooled in heat exchanger 46 and passed back to the base of the heating chamber 2 via conduit 47.

The whole is a substantially closed system and it is preferably filled with nitrogen in order to prevent or retard oxidation of the graphite plates forming the heating spherulizing zone walls 8, 9, and of the electrical heating elements 26.

The spherulizing furnace described above and illustrated in FIG. 1 makes use of the invention described in our copending Patent Application, filed together in this country, entitled "Spherulizing furnace and process of manufacturing vitreous beads" and claiming the priority of the British Patent Application No. 87 16 188 of 9th July 1987, which corresponds to U.S. Patent Application Ser. No. 07/216,646.

In a variant, the furnace illustrated in FIG. 1 has a cylindrical spherulizing zone.

Figure 2:
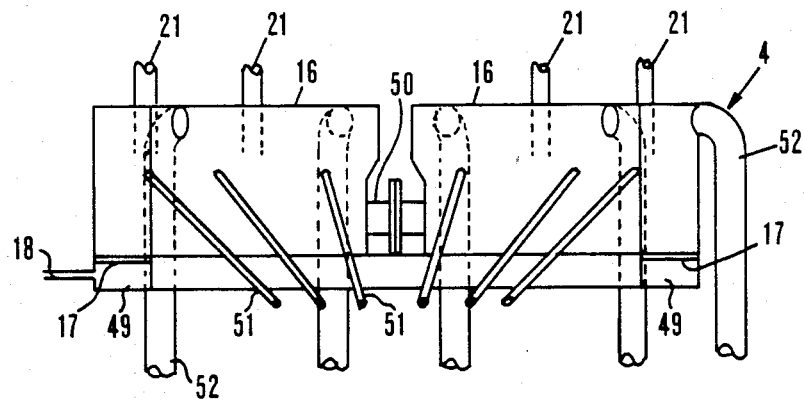
FIG. 2 is a cross sectional view of a second embodiment of feedstock delivery means.
Figure 3:
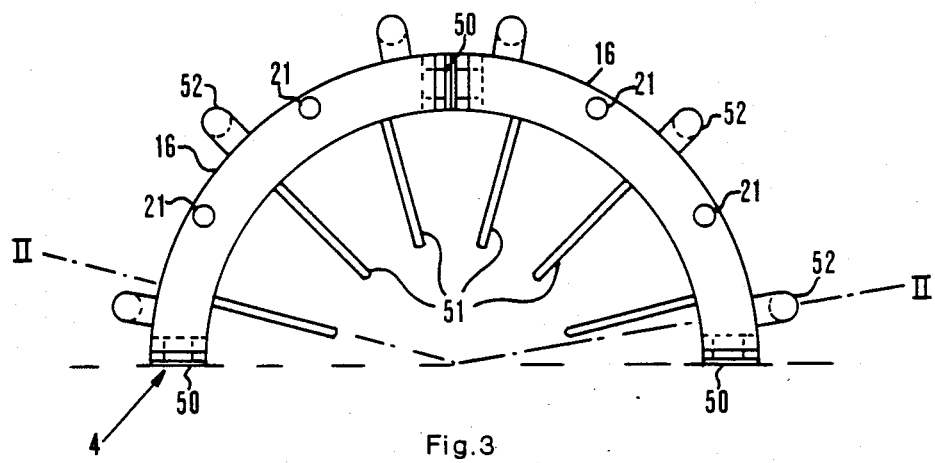
FIG. 3 is a partial plan view of the feedstock delivery means of FIG. 2.
Figure 4:
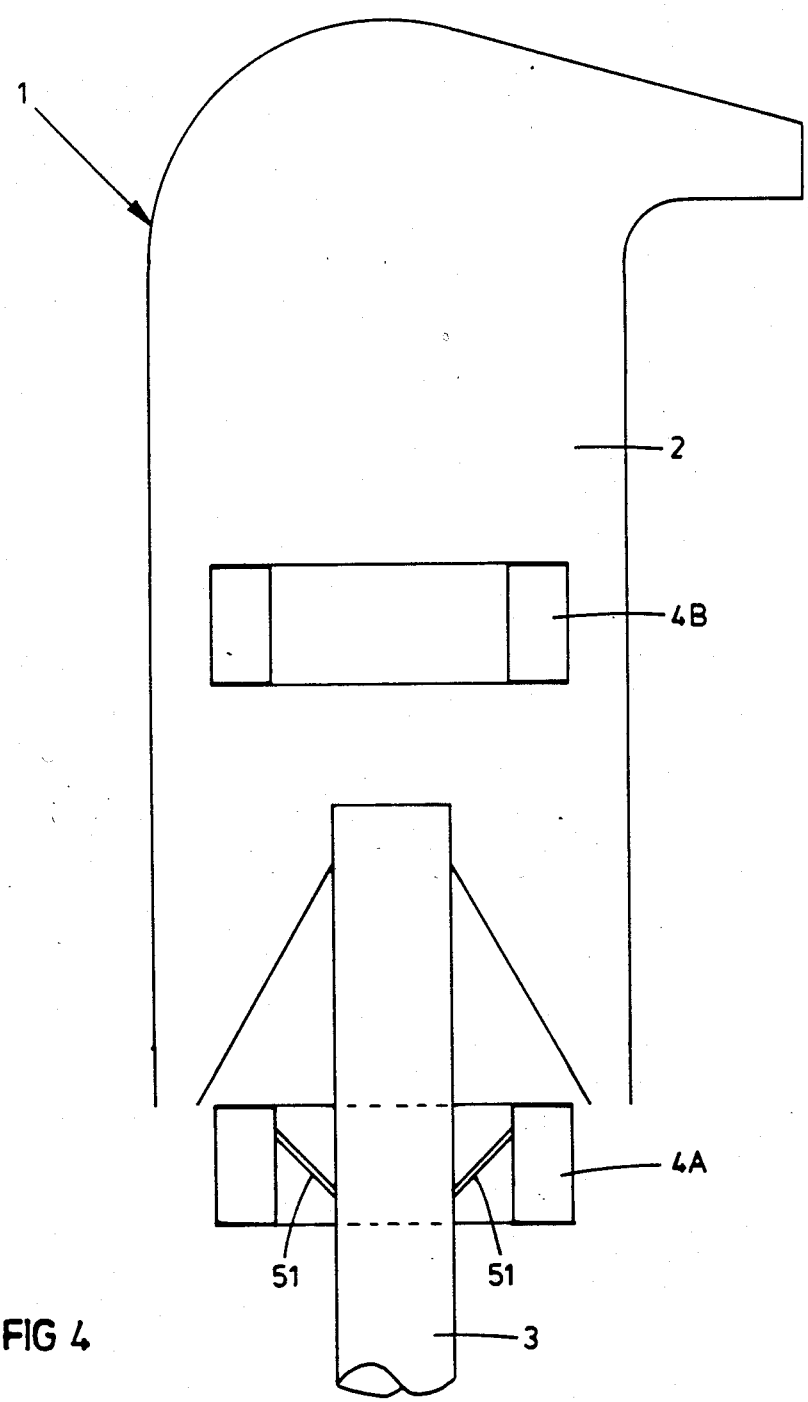
FIG. 4 is a cross sectional view of a spherulizing furnace incorporating such an embodiment of feedstock delivery means.

FIGS. 2 and 3 show an alternative embodiment of feedstock delivery means 4 suitable for use in conjunction with a spherulizing furnace as shown in FIG. 4.

In FIGS. 2 and 3, the feedstock delivery means 4 comprises four quadrant shaped fluidized bed reservoirs 16 having porous soles 17 separating them from plenum chambers 49 fed with compressed fluidizing gas via conduit 18. The four reservoirs 16 are arranged in a circle and are placed in fluidized bed intercommunication via pipes 50. Feed outlet pipes 51 for delivering fluidized feedstock by overflow to a heated spherulizing zone are provided, as are overflow control outlet pipes 52. These overflow control outlet pipes are at a higher level than the delivery outlet pipes 51 so that a constant bed height can easily maintained simply by charging the bed via conduits 21 at a rate which is greater than the bed delivery rate.

In a variant of the embodiment shown in FIGS. 2 and 3, the feedstock outlet delivery pipes 51 are replaced by a conical chute down which the feedstock particles can flow from slots formed in the inner walls of the four fluidized reservoirs 16.

FIG. 4 shows a cylindrical tower furnace 1 comprising a combustion chamber 2 containing a spherulizing zone fed with a combustible gas mixture through a burner tube 3. Two alternative locations 4A and 4B are shown for feedstock delivery means 4 as illustrated in FIGS. 2 and 3. The feedstock deliver outlet pipes 51 of the lower feedstock delivery means location 4A project into the burner tube 3 and are arranged with circular symmetry so that the feedstock is delivered to the burner tube evenly, when it will be entrained upwardly by the combustible gas mixture for spherulization in the combustion chamber 2.

The upper feedstock delivery means location 4B is within the combustion chamber 2 and accordingly feedstock contained in it will be preheated by the burner flames. It will be appreciated that the delivery outlet pipes of that feedstock delivery means will have to be longer in order to deliver the feedstock to the burner tube 3 at the same level as the lower delivery means.

What is claimed is:

1. A spherulizing furnace for manufacturing vitreous beads, comprising:
    feed means for delivering feedstock in particulate form to the spherulizing furnace
    a chamber including a spherulizing zone to which spherulizing zone the feedstock is delivered and in which the feedstock is heated and converted to vitreous beads; and
    means for collecting the vitreous beads,
    wherein the feed means comprises a feedstock reservoir including fluidizing means for providing a fluidized bed of feedstock particles, the feedstock reservoir having at least one overflow feed outlet opening over which fluidized particles can flow under gravity for delivery to the spherulizing zone.

2. The spherulizing furnace according to claim 1, whereing the feedstock reservoir has at least one overflow control outlet opening at a higher level than that of the at least one overflow feed outlet opening.

3. The spherulizing furnace according to claim 1, wherein the spherulizing zone of the chamber has a transverse cross-section and wherein the feed means is arranged to deliver fluidized particles substantially symmetrically along the transverse crosssection of the spherulizing zone.

4. The spherulizing furnace according to claim 1, wherein means is provided for heating the feedstock reservoir to preheat the feedstock particles comprising the fluidized bed.

5. A process for manufacturing vitreous beads, comprising:
    providing fluidized particles of feedstock as a fluidized bed thereof in a feedstock reservoir provided with particle fluidizing means
    delivering the fluidized particles of feedstock under gravity by fluidized overflow from the feedstock reservoir to a spherulizing zone of a spherulizing furnace;
    spherulizing the fluidized particles of feedstock by passing same through the spherulizing zone where they are heated and converted to vitreous beads; and
    collecting the vitreous beads.

6. The process according to claim 1, wherein the fluidized bed is maintained at a constant height.

7. The process according to claim 5, wherein the spherulizing zone has a transverse cross-section and wherein the fluidized particles are delivered substantially symmetrically along the transverse cross- section of the spherulizing zone.

8. The process according to claim 5, wherein the fluidized particles are heated in the fluidized bed prior to delilvery.

* * * * *